United States Patent [19]

Zuckerman

[11] 3,801,745

[45] Apr. 2, 1974

[54] TELEPHONE CALL DURATION TIMER

[76] Inventor: Walter Zuckerman, 15622 Royal Ridge Rd., Sherman Oaks, Calif. 95682

[22] Filed: Aug. 23, 1971

[21] Appl. No.: 174,007

Related U.S. Application Data

[63] Continuation-in-part of Ser. No. 865,132, Oct. 9, 1969, abandoned.

[52] U.S. Cl. .......... 179/7.1 R

[51] Int. Cl. .......... H04m 15/30

[58] Field of Search .......... 179/7.1 R, 7.1 TP, 2 T C, 179/6.31, 27 FB, 6 TA, 7 R, 6 R, 84 B

[56] References Cited

UNITED STATES PATENTS

| | | | |
|---|---|---|---|
| 3,320,366 | 5/1967 | Plummer | 179/7.1 TP |
| 3,204,032 | 8/1965 | Pitts, Jr. | 179/6 R |
| 3,156,781 | 11/1964 | Hemminger | 179/84 B |
| R23,855 | 7/1954 | Peterson | 179/6 R |
| 2,488,797 | 11/1949 | Baker | 179/7.1 R |
| 3,590,161 | 6/1971 | Jacobs | 179/7.1 R |
| 2,602,119 | 7/1952 | McCarthy | 179/7.1 R |
| 2,595,062 | 4/1952 | Elliott | 179/7.1 R |
| 3,512,355 | 5/1970 | Lang | 179/7.1 R |

*Primary Examiner*—Thomas W. Brown

[57] ABSTRACT

A system is disclosed for automatically supervising the usage of telephone lines. The system includes a customer-provided call timer device which is connectable to a telephone company installed telephone coupler unit and controls the unit to impress a first audio alert signal onto the local telephone lines associated therewith after the lines have been in use for a preselected time period. The call timer device further controls the telephone coupler unit to impress recurring audio alert signals at preselected time intervals following the first audio alert signal and for the remainder of the call. The telephone coupler unit may be a standard telephone company coupler unit that has been modified and is so connected to the lines leading to the local telephone equipment and the lines leading to the central office that the audio alert signals are only discernable on the local telephone equipment.

8 Claims, 9 Drawing Figures

WALTER ZUCKERMAN
INVENTOR.

BY
Beehler, Arant & Jagger
ATTORNEYS

WALTER ZUCKERMAN
INVENTOR

BY Bahler, Arant, Jagger
ATTORNEYS

WALTER ZUCKERMAN
INVENTOR.

BY Buhler, Arant & Jaeger
ATTORNEYS

WALTER ZUCKERMAN
INVENTOR.

BY Bachler, Arant & Jagger
ATTORNEYS

WALTER ZUCKERMAN
INVENTOR

BY Buhler, Arant & Jagger
ATTORNEYS

WALTER ZUCKERMAN
INVENTOR

BY Buckles, Arant & Jagger
ATTORNEYS

TELEPHONE CALL DURATION TIMER

CROSS REFERENCE TO RELATED APPLICATIONS

This application is a continuation-in-part of copending application Ser. No. 865,132 filed Oct. 9, 1969, and now abandoned.

BACKGROUND OF THE INVENTION

This invention relates generally to a system for supervising the usage of telephone lines by alerting the telephone user when a call exceeds a preselected time period. More particularly the invention relates to a call timer device adapted to control a telephone company coupler unit so as to cause audio signals to be impressed on the telephone lines as an indication of the duration of the call.

In many businesses, telephone charges are a significant factor in overall operating expenses, and more efficient use of telephone time can produce significant savings. This is obviously the case for long distance calls where additional message units for time in excess of the minimum period are involved. However, inefficient use of telephone time is also expensive on local calls when message units are charged on all calls made from business phones; and, in large offices, improper telephone procedures can necessitate the leasing of additional telephone equipment and lines.

Surveys indicate that a significant percentage of business telephone calls include idle conversation. Some of this is necessary, but in most cases it can be reduced if the caller is aware that the call has continued for a particular duration and that additional message units are being charged.

Hence a device which would alert the caller at the end of a preselected time period could greatly increase the efficiency of telephone communications in many business organizations.

To be practical such an alerting device should be sufficiently flexible in its modes of operation so as to be readily compatible with the various and changing business requirements. Also it should be controllable by the management of the business organization and to such an extent that it alerts the user of the telephone to an overtime condition, but does not interfere with the conversation being conducted. Further such a device should be easy to connect to the telephone system, but must not interfere in any way with the functioning of the telephone company equipment.

SUMMARY OF THE INVENTION

This invention meets the above stated requirements by adapting a customer-provided call timer device to control a modified telephone company coupler unit to cause the latter to apply audio alert signals at preselected time intervals onto associated local telephone lines after a call on a local telephone exceeds a first preselected time period.

The call timer device comprises a sensing circuit connected to the telephone coupler unit for sensing when the local telephone lines associated with the unit are in use, a timing circuit for providing outputs when the call has continued for the first preselected time period and at preselected time intervals thereafter, and an actuation circuit responsive to the outputs of the timing circuit for controlling the telephone coupler unit to apply a first audio alert signal to the telephone lines when the call extends past the first selected time period and to apply recurring audio alert signals to the lines at the preselected time intervals thereafter and for the remainder of the call, and recording devices for tabulating data as to the number and duration of the calls and the number and duration of overtime portions of the calls placed on the associated telephone lines.

The call timer device further includes a first and second manually settable switch, each of which has a range of settings and can be respectively set by the customer to enable the timing circuit to measure the preselected time period of the call before the first alert signal is applied on the telephone lines, and the preselected time intervals thereafter at which the alert signals recur on the lines.

The telephone coupler unit, which may be a modified version of a piece of equipment installed and maintained by the telephone company, includes a control relay, a voltage source, and circuit means coupled to the telephone lines through the control relay when actuated for generating audio alert signals. When the local telephone instrument is placed into use by lifting of the hand-set from its cradle, the control relay is automatically connected in series with the voltage source so as to provide a potential across a pair of output terminals. The output terminals of the telephone coupler unit are available for customer use and the unit is actuated by supplying a short circuit across these output terminals.

The call timer device is connected across the output terminals of the telephone coupler unit in such a manner that when the local telephone is placed into use for a call, the sensing circuit of the call timer device senses the potential on the output terminals and initiates the timing circuit. After the timing circuit has determined that the call has continued for the preselected timer period, the output is provided to the actuation circuit which short circuits the output terminals of the coupler unit to cause the unit to apply a first audio alert signal to the telephone lines. Then at preselected fixed intervals thereafter, the timer circuit provides outputs to the actuating circuit which short circuits the output terminals of the coupler unit to cause the unit to apply repeat audio alert signals to the telephone lines.

The circuits of the telephone coupler unit are modified and the coupler unit is connected to the local equipment and to the central office in such a manner that audio alert signals applied to the telephone lines under the control of the call timer device are only discernable on the local telephone equipment. This feature provides for the alerting of the local user of the telephone that a call has entered the overtime period without causing concern or confusion to the party on the distant end of the line.

Accordingly, it is an object of the subject invention to provide a call timer device which controls a modified telephone coupler unit to cause the unit to apply audio alert signals to associated telephone lines in such a manner as to supervise the usage of the telephone lines.

It is another object of the invention to provide a telephone call timer device which is readily connectable to a telephone coupler unit and which provides for selectively controlling the initiation and repetition rate at which audio alert signals are applied onto the telephone lines by the telephone coupler unit to advise the user of the telephone as to the duration of a call.

A further object is to provide a customer provided call timer device which controls a telephone company coupler unit such that once the associated telephone lines are placed in use, after a delay period selectable by the customer the coupler unit will apply recurring audio alert signals to the telephone lines at time intervals also selectable by the customer.

It is still another object of the invention to provide a telephone call timer system wherein the time period which is allowed for a call prior to application of a first audio alert signal on a local telephone is manually selectable at the site of the local telephone and wherein the time interval between the application of recurring audio alert signals on the local telephone is also manually and separately selectable at the site of the local telephone.

Another object is to provide a telephone call timer device for controlling a telephone company coupler unit which has been modified to apply audio alert signals to the associated local telephone circuits, while inhibiting the audio alert signals from being transmitted on the outgoing lines leading to the central office.

Another object is to provide data readout equipment for a call timer device to enable the recording of data concerning the number and the time duration of the telephone calls made over the telephone lines being supervised by the call timer system.

With these and other objects in view, the invention consists of the construction, arrangement and combinations of the various parts of the device, whereby the objects contemplated are attained as herein set forth, pointed out in the appended claims and illustrated in the accompanying drawings.

DESCRIPTION OF THE PREFERRED EMBODIMENT

Figures 1, 2A:
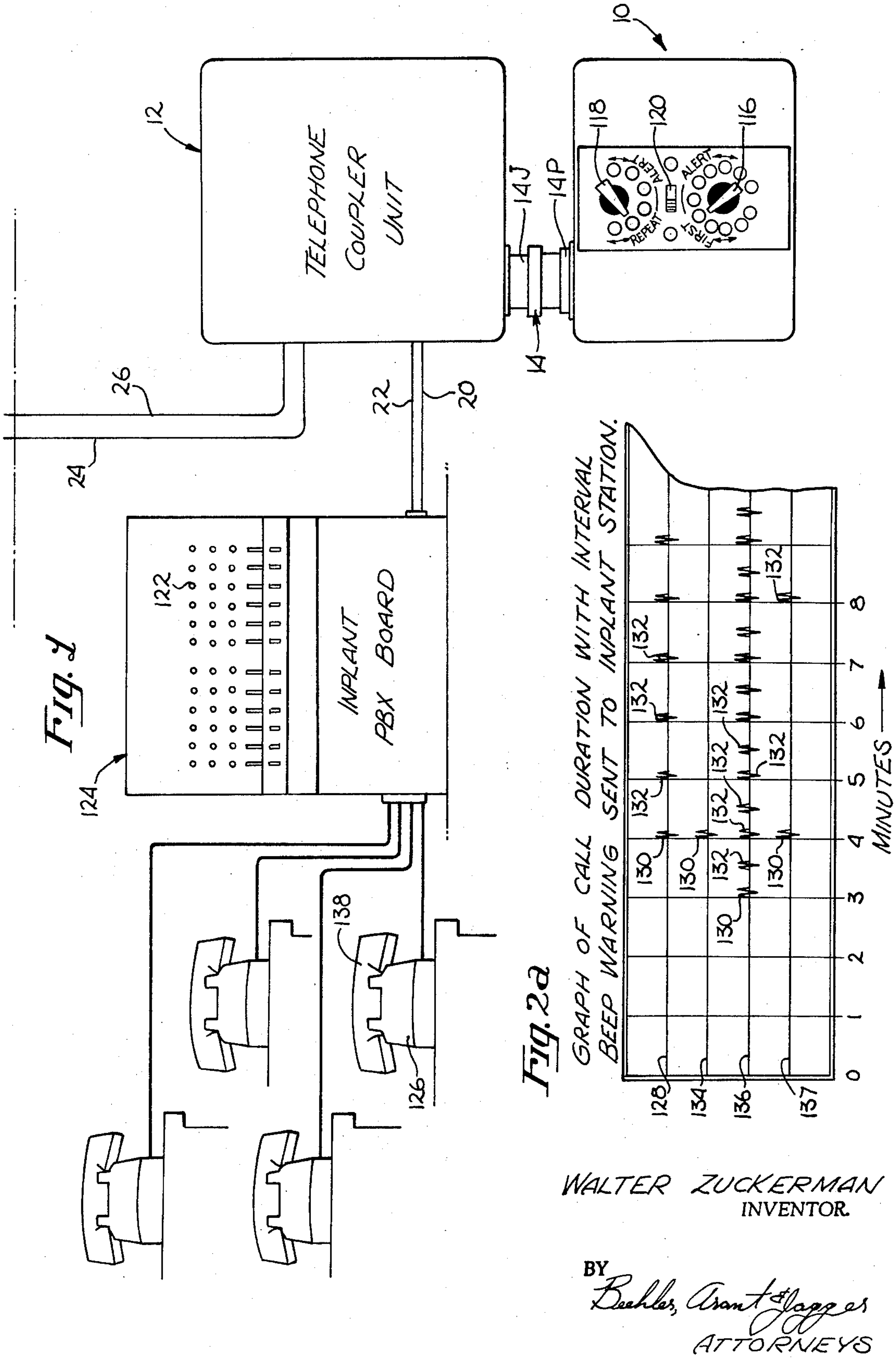
FIG. 1 is a pictorial view of a telephone usage supervisory system in accordance with the subject invention.
FIG. 2*a* is a graph showing the manner in which audio alert signals may be applied to the telephone lines dependent on various control settings of the telephone call timer device.
Figure 2:
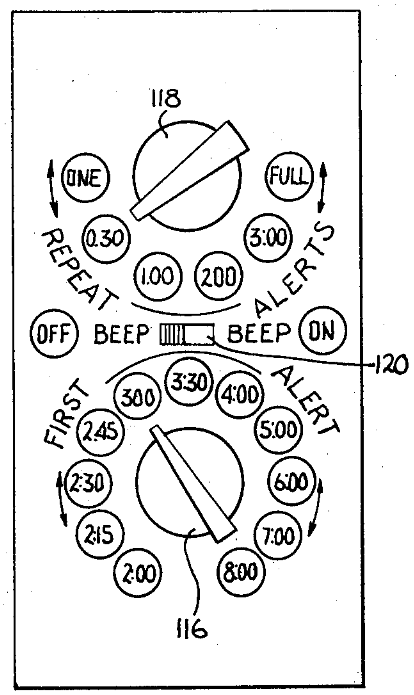
FIG. 2 is a front plan view of the control panel of the telephone call timer device shown in the system of FIG. 1.

In the embodiment of the subject invention shown in FIG. 1, a customer provided call timer device 10 is connected to a modified telephone company coupler unit 12 by a connector 14. The call timer device 10 controls the telephone coupler unit 12 to cause this unit to apply audio alert signals to associated local telephone lines to inform the user of the local telephone as to the status of the time duration of the call. The time period before the first audio alert signal is selected by means of a First Alert time switch 116 on the call timer device 10. The time period between the first audio alert signal and the first repeat audio alert signal and between subsequent repeat audio alert signals is selectable by means of a Repeat Alert time switch 118 (see FIG. 2). The mode of operation of the device 10 is controlled by a mode switch 120. In the "beep-off" position of the switch 120, which is a condition useful for gathering data as to unsupervised telephone usage, all audio alert signals are inhibited from being impressed on the telephone lines. In the "beep-on" position of the switch 120 the audio alert signals are applied to the local telephone lines as explained hereinafter.

The system shown in FIG. 1 is coupled to one circuit 122 of an in plant PBX board or switchboard 124 so as to supervise the telephone usage of any call placed through the circuit 122. This arrangement allows for the most efficient utilization of the call timer device as the circuit 122 can be reserved for calls on which supervision is more cost effective – such as long distance calls. The First Alert time switch 116 is set to the desired average length of the calls to be monitored. The determination of the average length of the call for any given organization will be discussed subsequently relative to the embodiment of FIG. 3. After any telephone call has extended for a time period equal to the setting of the First Alert time switch 116, the system of the present invention provides for an audio alert signal to be applied to the telephone lines to inform the user that the call has extended into the overtime period. If the call continues, the system provides for repeat audio alert signals to be applied to the lines at time intervals determined by the setting of Repeat Alert time switch 118. After the just discussed controls have been initially set, all calls placed through the monitored circuit (position 122 on the switchboard 124) are automatically supervised in accordance with the just described procedure.

Waveform 128 of FIG. 2*a* depicts a situation where First Alert time switch 116 has been set for 4 minutes and Repeat Alert time switch 118 for 1 minute. Accordingly, as shown in waveform 128, the first audio alert signal 130 occurs on the local telephone lines 4 minutes after the start of the monitored telephone call (lifting of the local telephone handset) and repeat audio alert signals 132 are applied at one minute intervals thereafter. Waveform 134 corresponds to the situation where First Alert time switch 116 has been set for four minutes and Repeat Alert time switch 118 has been set to the "One" position and as will be explained in greater detail subsequently, in this position no repeat audio alert signals are applied to the local lines. Waveform 136 illustrates the situation where the First Alert time switch 116 has been set for 3 minutes and the Repeat Alert time switch set for 30 seconds and hence the first audio alert signal 130 occurs 3 minutes after the start of the monitored call and repeat alert signals 132 are applied at 30 second intervals thereafter for the remainder of the call. Waveform 137 illustrates the situation where the First Alert time switch 116 has been set for 4 minutes and the Repeat Alert switch 118 has been set to its "Full" position which provides for the first audio alert signal 130 to occur after four minutes and the repeat audio alert signals 132 to be impressed on the line after a time period equal to that of the first alert period, i. e., 4 minutes.

Figure 5:
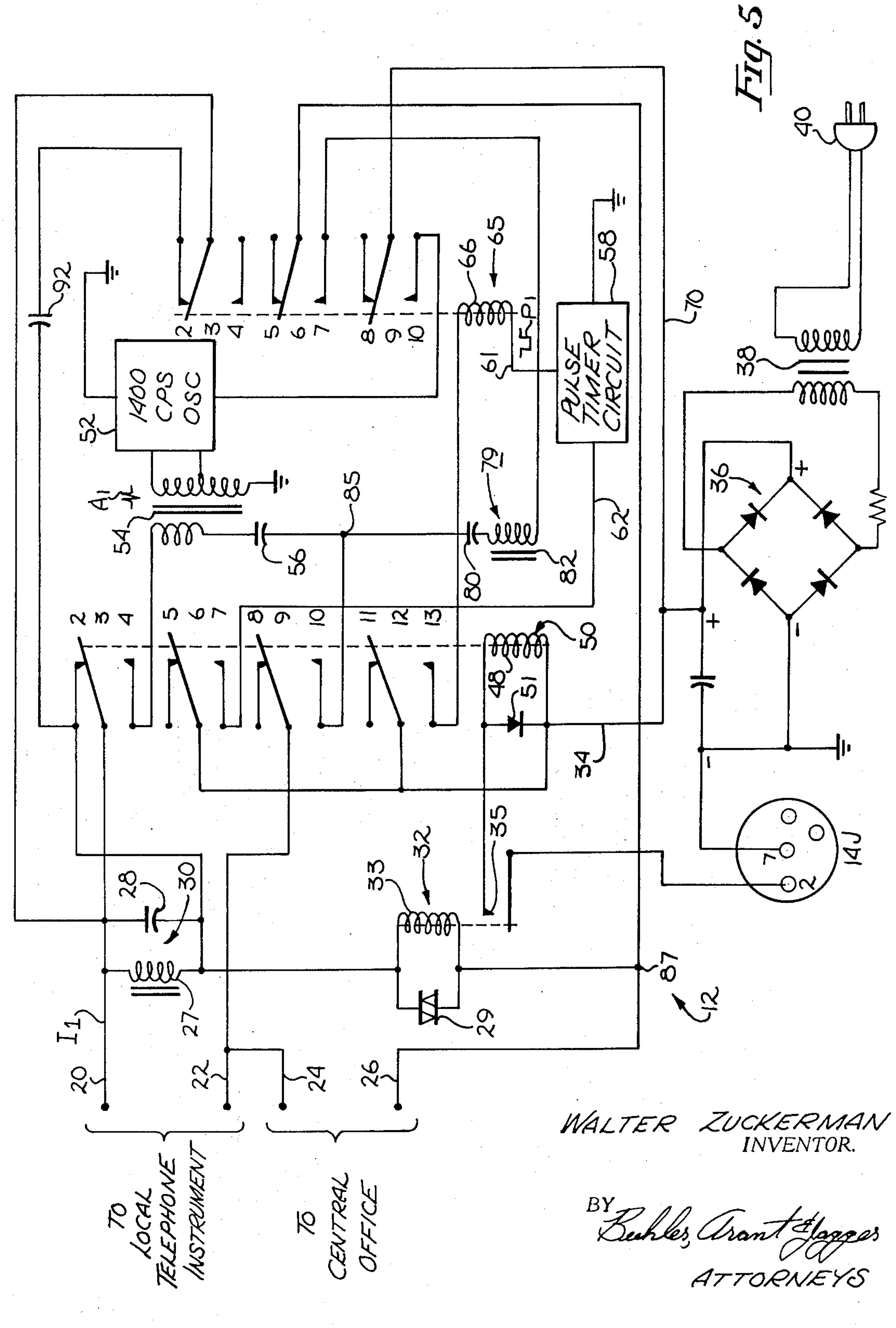
FIG. 5 is a schematic and block diagram of a telephone company coupler unit which is controlled by and communicates with the call timer device, and which includes modifications to inhibit the audio alert signals from being impressed on the outgoing telephone lines.

The call timer system of the subject invention may be better understood by first examining the structure and operation of the telephone coupler unit 12 shown in FIG. 5. The last mentioned unit is basically a portion of a standard piece of telephone company equipment that is normally utilized to record telephone conversations. A typical unit that could be utilized is the recorder connector unit supplied by Western Electric Co., model KS-19641-L2, for example. The main purpose of such a unit normally is to impress "beep tones" or audio signals on the telephone lines so that the party on the other end of the line, i.e., the distant party, is made aware that the local party is making a recording of the conversation taking place. Only the portion of a recorder connector unit associated with the subject invention and the modification thereto in accordance with the present invention are shown and described herein—it being understood that the unit includes additional circuitry not relevant to the operation of the call timer system of the present invention.

Referring now primarily to FIG. 5, leads 20 and 22 on the telephone coupler unit 12 are connected to the local telephone instrument 126 through switchboard 124 (FIG. 1) and leads 24 and 26 thereof are connected to the lines leading to the central office (not shown). It should be noted that this just described connective arrangement of the leads of unit 12 to the telephone lines and the central office is reversed from the normal hookup of a standard telephone company coupler unit which is a part of a recorder connector unit as will be explained hereinafter.

Actuation of the telephone lines by lifting the associated telephone hand set 138 causes a current $I_1$ to flow from the telephone instrument 126, through lead 20, capacitor-inductor filter 30, coil 33 of off-hook relay 32, lead 26, the central office, and leads 24 and 22, and then return through the telephone instrument 26 to lead 20.

The current $I_1$ energizes the low resistance off-hook relay 32, whose coil 33 is protected by a varistor 29, and closes its contact 35 such that terminal 2 of a jack 14J is connected to one side of the coil 48 of a control relay 50. The other side of coil 48 is permanently connected by a lead 34 to the positive side of a voltage source 36. The negative side of the voltage source 36 is coupled to the ground potential plane and to a terminal 7 of jack 14J. The voltage source 36 includes an alternating current source, at 115 volts, which is applied to the primary of the transformer 38 through a plug 40 to operate the unit 12. The positive 22 volts of voltage source 36, as supplied on lead 34 to the coil 48 of control relay 50 is also connected in parallel to the arm of normally open contacts 6 and 7 and the arm of normally open contacts 12 and 13 of control relay 50. A diode 51 is connected across the coil 48 of control relay 50 and functions as an arc surpressor.

It should now be clear that current $I_1$ will flow in the unit 12 whenever the connected local telephone handset 138 is removed from its cradle. This current $I_1$ will cause closure of low resistance off-hook relay 32. Once relay 32 is closed it is then possible to close control relay 50 and render the tone circuitry in unit 12 operative by connecting a low resistance circuit across terminals 2 and 7 of jack 14J.

Thus when control relay 50 is actuated by placing a low resistance circuit across terminals 2 and 7 of jack 14J, an output transformer 54 coupled to an oscillator 52 has one end of its secondary winding coupled by a capacitor 56 through the now closed contacts 9 and 10 of control relay 50 to lead 22 and the other end of its secondary winding coupled through the now closed contacts 3 and 4 of control relay 50 to lead 20. Furthermore, the closing of contacts 6 and 7 of control relay 50 connects voltage source 36 by way of lead 62 to a timer pulse circuit 58, and the closing of contacts 12 and 13 of control relay 50 connects the voltage source 36 to one side of a coil 66 of a pulse relay 65.

In response to the positive 22 volts of voltage source 36, timer pulse circuit 58 is rendered operable and after 15 seconds impresses a negative pulse $P_1$ on output lead 61 which is connected to the other side of coil 66 of pulse relay 65 causing closure of relay 65 during the pulse $P_1$. Pulse $P_1$ may be one-fifth of a second in duration and have a repetition rate of 15 seconds. For example, a one-fifth of a second pulse is generated every 15 seconds when timer pulse circuit 58 is activated. The closure of pulse relay 65 closes contacts 9 and 10 thereof and applies the plus 22 volts of voltage source 36 on lead 70 to the oscillator 52 rendering it operative. Thus in response to each pulse $P_1$, the oscillator 52 generates an audio alert tone or signal $A_1$ of substantially the same time duration as pulse $P_1$. The audio signal $A_1$ may have a carrier frequency of 1,400 cycles per second. Accordingly, when control relay 50 is activated at preselected time intervals by current flow in a low resistance circuit included in call timer 10, which circuit is connected across terminals 2 and 7 of jack 14J, audio alert signals $A_1$ corresponding to the desired first audio alert signal and repeat audio alert signals are applied to contacts 3 and 4 and contacts 9 and 10 of control relay 50 and to the leads 20 and 22 connected to the local telephone lines.

As described above, unit 12 may be a standard telephone company telephone coupler unit. However, in that case the audio alert signals will be applied not only to the local telephone lines but also to the outgoing lines to the central office. In some installations this may be undesirable as the party may not be familiar with the subject system and interpret the audio alert signals as indications that the current conversation is being recorded. In accordance with the invention, the level of the audio alert tones or signals on the outgoing lines to the central office is reduced by reversing the lead connections provided by the telephone coupler unit of the recorder connector unit previously mentioned. This reduction in tone level results from the fact that parallel tuned filter 30 reduces the signal tone level applied to the outgoing leads 24 and 26 in the described arrangement. Normally the filter 30 functions to equalize the audio signals heard by both parties by attenuating the signal applied by way of the leads to the local telephone instrument. It should be noted that in FIG. 5 filter 30 is shown in a simplified form for clarity of explanation, it being understood that additional filter elements may be included in the actual aforementioned unit.

Next to be described is a simple modification which is made to the telephone coupler unit portion of the standard telephone company recorder connector to effectively and completely eliminate the impressing of the audio alert signals on the outgoing leads 24 and 26 connected to the central office. This is accomplished by connecting a filter 79 comprised of capacitor 80 and an inductor 82 in series with normally open contacts 6 and 7 of relay 65 which contacts provide a connection between a junction point 85 on the capacitor 56 end of the secondary winding of transformer 54 and a junction point 87 connecting the coil 33 of off-hook relay 32 to the lead 26. The series tuned filter 79 provides a low parallel impedance to the 1,400 C.P.S. audio alert signals across the leads 24 and 26 connected to the outgoing leads to the central office. Capacitor 80 may have a value of 0.264 microfarads and inductor 82 may have a value of 0.05 henrys, for example. It should be noted that contacts 6 and 7 of relay 65 may be the unused 3 contacts of the relay designated "BT" in the standard telephone company recorder connector previously referred to. Thus it is only when the audio alert signal is impressed by the one-fifth of a second closure of pulse relay 65 that the new filter 79 is connected into the circuit and is simultaneously operated to eliminate the audio alert signals on the outgoing leads 24 and 26.

It should be noted that filter 30 which attenuates the tone level of the audio alert signal on the outgoing leads 24 and 26 is likewise kept out of the circuit except during the burst of one-fifth of a second audio tone. This is done by the combined operation of the normally closed contacts 2 and 3 on control relay 50, the capacitor 92 and the normally closed contacts 2 and 3 on the relay 65. When either contacts 2 and 3 of relay 50 or contacts 2 and 3 of relay 65 are closed, capacitor 92 is connected in parallel across filter 30 rendering filter 30 ineffective. When both relays 50 and 65 are energized, which is during the period the audio signal $A_1$ is applied, the filter 30 is effective in attenuating this signal on the outgoing leads 24 and 26.

It should now be clearly understood that in order to provide the telephone coupler unit 12 used in the call timer system of the present invention, a standard telephone coupler unit may be simply modified by the addition of two small, low cost elements in the form of capacitor 80 and inductor 82. Since relay 65 is energized only during the one-fifth second time interval that audio signals are applied, the modification does not in any way affect the normal quality of the communications.

Having described the telephone coupler unit 12 which functions to provide an audio alert signal on the telephone lines in response to a low resistance circuit connection, i.e., a short circuit, across terminals 2 and 7 of jack 14J, the call timer device 10 which provides for selectively connecting such a low resistance circuit for controlling the unit 12 in accordance with manually settable time switches 116 and 118 will next be described.

Figure 6A:
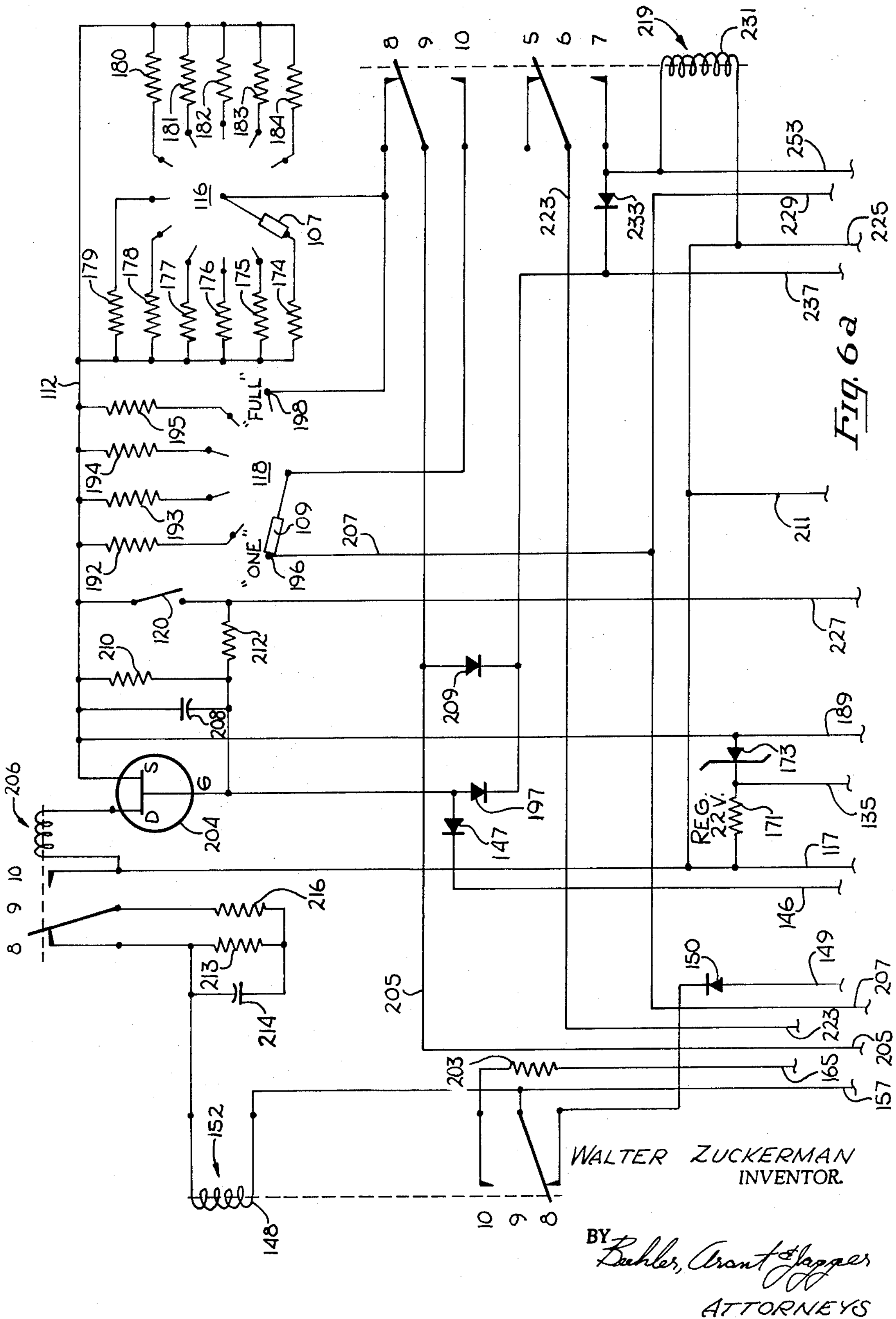
FIGS. 6*a* and 6*b* are a schematic diagram of one preferred embodiment of the telephone call timer device shown in FIG. 1.
Figure 6B:
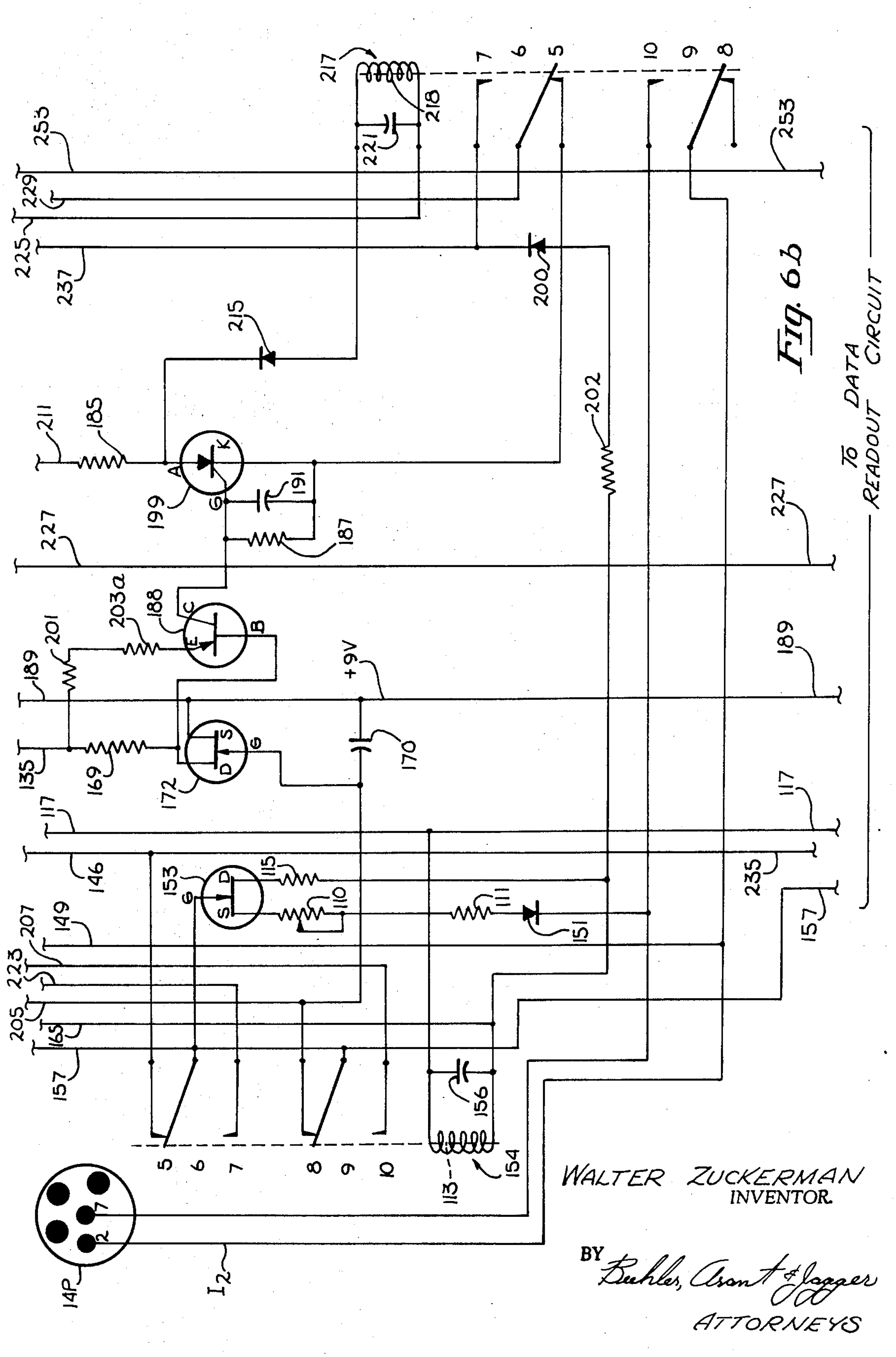

Referring to FIGS. 6*a* and 6*b*, when the telephone lines are not in use there is no d.c. voltage at terminals 2 and 7 of the jack 14J of unit 12 and the call timer device 10 which is connected thereto by terminals 2 and 7 of plug 14P is inoperative. As described above, lifting of the hand-set 138 of the telephone instrument 126 (FIG. 1) closes off-hook relay 32 (FIG. 5) causing a voltage of plus 22 volts from voltage source 36 to be applied to terminal 2 and a voltage of minus 22 volts from source 36 to be applied to terminal 7 of plug 14P. As shown in FIGS. 6*a* and 6*b* the voltage at terminals 2 and 7 is connected across a sensing circuit in the call timer device 10 which comprises a sensing relay 154 and a field-effect transistor (FET) 153. Thus the positive voltage of terminal 2 is applied by a lead 149 to an isolating diode 150 and normally closed contacts 8 and 9 of relay 152 and lead 157 to the gate terminal G of field-effect transistor 153 to turn this transistor on. The field-effect transistor 153 is normally turned off by having its gate G connected by lead 157 to the negative terminal 160 of a power supply 158 (FIG. 7) provided for the call timer device 10. The D terminal of fieldeffect transistor 153 is connected through a surge protecting resistor 115 to one side of the coil 113 of sensing relay 154. The other side of the coil 113 of sensing relay 154 is connected by lead 117 to the positive terminal 162 of the power supply 158.

The S terminal of the field-effect transistor 153 is connected through variable resistor 110 and resistor 111, and an isolating diode 151 to the negative terminal 7 of the plug 14P. Because of these current limiting resistors the current $I_2$ in the series circuit across terminals 2 and 7 is insufficient to activate, that is, "pull in" control relay 50 (FIG. 5); however, the current flowing through field-effect transistor 153 and the coil 113 of relay 154 is sufficient to activate sensing relay 154.

It should now be clearly understood that with the sensing circuit in the call timer device connected to terminals 2 and 7 of the telephone coupler unit 12, as above described, the telephone coupler unit 12 operates in response to the off-hook relay 32 to connect voltage supply 36 across coil 48 of control relay 50 but does not close relay 50. This control relay 50 will not close until terminals 2 and 7 of plug 14P are connected by a low resistance circuit, that is, effectively shorted. It should be further understood that the variable resistor 110 is provided so that the current $I_2$ can be adjusted such that it will not close control relay 50 but will provide sufficient current to hold it closed if it is once closed.

In the embodiment of the invention shown, the coil 48 of control relay 50 has a resistance value of about 2,100 ohms, the coil of sensing relay 154 has a resistance value of about 5,000 ohms, and the current $I_2$ is about 3 milliamperes. The characteristics of sensing relay 154 are such that it will pull in, that is close, in response to 3 milliamperes but control relay 50 requires a greater magnitude of current to close, although 3 milli-amperes of current will hold control relay closed once it has been activated. A capacitor 156 is coupled across coil 113 of sensing relay 154 to hold this relay closed during momentary interruptions in the current $I_2$.

In summary, when the telephone lines are not in use an 0 volt open circuit exists across terminals 2 and 7 of connector 14 and, therefore, field-effect transistor 153 in the sensing circuit of the call timer device 10 does not conduct since it has a minus 34 volt from power supply 158 on its gate G, plus 34 volts from the power supply 158 on its drain D, and 0 volts on its source S.

Since transistor 153 is not conducting, sensing relay 154 is not activated.

Now then, when the telephone lines are in use as evidenced by lifting the telephone hand-set 138, a plus 22 volts appears at terminal 2 and a minus 22 volts at terminal 7 of jack 14J. The plus 22 volts on the gate G and the minus 22 volts on the source S of field-effect transistor 153 causes transistor 153 to conduct current $I_2$ through the series circuit connected across terminals 2 and 7. The adjustable resistor 110 permits the current through the control relay 50 to be adjustable for its particular voltage and current pull in characteristics such that control relay 50 does not close but sensing relay 154 does close in response to current $I_2$.

The d.c. power supply 158 produces approximately −34 volts at terminal 160 and +34 volts at terminal 162. The supply 158 includes a rectifier bridge 164, a step-down transformer 166 and a filter capacitor 168 coupled across terminals 160 and 162. Alternating current at 115 volts a.c. provided by plug receptacle 228 is applied to the primary of the transformer 166. A resistor 171, zener diode 173 (FIG. 6*a*), and a zener diode 190 (FIG. 7) are coupled by lead 189 in series between the terminals 160 and 162 and in such a manner as to provide a regulated plus 22 volts d. c. at the cathode of zener diode 173, and a plus 9 volts at the junction of the cathode of zener diode 190 and the anode of zener diode 173.

Closure of sensing relay 154 opens contacts 8 and 9 thereby removing the negative voltage of supply 158 from the junction of a switch timing capacitor 170 and the gate terminal G of a field effect transistor 172. As used herein, relative to power supply 158, the term negative voltage means a potential applied from terminal 160 of the supply. Also sometimes hereinafter the term field-effect transistor will be abbreviated as "FET". The charge on switch timing capacitor 170 decays at a rate determined by the setting of the First Alert time switch 116 which selectively connects the resistor from one of the eleven positions associated with resistors 174 through 184. In the illustrated embodiment the range of discharge time constants is between two and 8 minutes (less 15 seconds). The common bus 112 of resistors 174 through 184 is connected by lead 189 to the positive side of switch timing capacitor 170 (the junction point of diodes 173 and 190), and the selector arm 107 of switch 116 places one of the eleven timing resistors 174–184 in series with the discharged current of switch timing capacitor 170.

When switch timing capacitor 170 discharges below the cutoff potential of FET 172, the latter begins to conduct and the current through resistor 169 from the regulated 22 volts on lead 135 lowers the voltage to the base B of transistor 188 to the point where it begins conduction. Current through the emitter-collector path of transistor 188 charges capacitor 191 which in turn gates on a silicon controlled rectifier (SCR) 199. The anode of silicon controlled rectifier 199 then assumes a lowered potential, causing relay 217 to operate in response to current which flows through a diode 215 coupled between the coil 218 of relay 217 and the anode of SCR 199. The other end of coil 218 is connected via leads 225 and 117 to the positive terminal 162 of supply 158.

Upon the closure of relay 217, contacts 5 and 6 thereof upon the negative return path through lead 229 of the silicon controlled rectifier 199, thereby returning the latter to the non-conductive state. When the silicon controlled rectifier 199 stops conducting, the relay 217 is de-energized shortly thereafter. Hence relay 217 is pulsed closed for only the short time period that the silicon controlled rectifier 199 conducts. A capacitor 221 is coupled across the coil 218 of relay 217 and determines the time duration that the relay 217 is pulsed closed.

During the short time that relay 217 is energized, closure of contacts 6 and 7 thereof provides a negative return through leads 229, 207, and contacts 9 and 10 of relay 154, for the coil 231 of relay 219. Once closed relay 219 will remain so, as long as relay 154 is closed, due to the negative return path via its own contacts 6 and 7 and contacts 6 and 7 of the activated relay 154. While relay 217 is pulsed closed, the negative voltage return path through contacts 6 and 7 thereof, lead 237, and diode 209 connected to lead 205, allows switch timing capacitor 170 to reach a potential sufficient to cut off conduction of FET 172. After relay 217 opens, switch timing capacitor 170 is now discharged through the resistor network associated with Repeat Alert time switch 118 via contacts 9 and 10 of relay 219, which relay was previously closed by the pulse closure of the relay 217.

In the illustrated embodiment the Repeat Alert time switch 118 allows the selection of time intervals of 30 seconds, 1 minute, 2 minutes or 3 minutes by means of the discharge time constants associated with the switch positions of resistors 192 through 195, respectively. Positions 196 and 198, labeled "One" and "Full", respectively, in FIGS. 1 through 3 and 6*a*, are also selectable by switch 118. When switch 118 is in the One position 196 the call timer device does not provide for any repeat audio alert signals being applied on the telephone lines inasmuch as a fixed negative voltage on lead 207 is applied through the One position, through contacts 9 and 10 of closed relay 219 and lead 205 to timing capacitor 170. On the other hand, when switch 118 is in the Full position, the call timer device does provide for repeat audio alert signals to be applied on the telephone lines after a time period equal to the original alert period since the arm 109 of switch 118 is then connected to the arm 107 of switch 116.

The pulse closure of relay 217 causes the actuation, i.e., closure of control relay 50 (FIG. 5) in the telephone coupler unit 12, since contacts 9 and 10 of relay 217 are coupled across the terminals 2 and 7 of plug 14P. This is a low resistance closure path and will draw sufficient current to close the control relay 50. Since relay 217 is only momentarily pulsed the low resistance closure path is automatically removed; however, control relay 50 will remain closed since the 3 milliamperes of current due to the resistance in the sensing circuit including the coil 113 of relay 154 is sufficient to hold relay 50 in once closed.

The momentary closure of contacts 9 and 10 of relay 217 will also remove the voltage to the gate of FET 153 and thus cut off the current supplied to the coil of relay 154. However, a negative potential return path is applied, by closure of contacts 6 and 7 of relay 217, to one side of the coil 113 of relay 154 through a diode 200 and a resistor 202; and a positive potential is continuously applied to the other side of the coil 113 from terminal 162. This newly supplied voltage plus the charge across capacitor 156 keeps relay 154 closed while the voltage through terminals 2 and 7 of plug 14P is removed by the operation involving the closure of control relay 50.

As previously described the operation of telephone coupler 12 is such that once control relay 50 is closed, after 15 seconds the timer circuit 58 produces a one-fifth of a second pulse $P_1$ which causes an audio tone signal to be generated by oscillator 52 during the duration of the pulse $P_1$. These audio tones would continue to be produced each 15 second time interval if control relay 50 were to remain closed. To prevent this continuous repetition of the tones every 15 seconds, the circuitry associated with FET 204, mode switch 120 and relay 206 is utilized as described below to deactivate control relay 50 within 23 seconds after it has been activated by the actuation circuit of the call timer device 10 such that only one audio alert signal is impressed on the lines.

Normally conductive FET 204 has a capacitor 208 and a resistor 210 coupled in parallel between its gate and source terminals. When relay 154 is not closed FET 204 is nonconductive since a negative potential is provided through closed contacts 5 and 6 of relay 154 and lead 146, through diode 147, to negatively charge capacitor 208. When relay 154 is energized, the negative potential is removed enabling FET 204 to conduct. When relay 217 is momentarily activated it closes contacts 6 and 7 thereof which applies a negative potential via isolating diode 197 on the gate input of FET 204 rendering it nonconductive. This negative potential also charges capacitor 208. When the negative potential is removed as a result of relay 217 again opening, FET 204 will again conduct after a time interval dependent on the discharging of capacitor 208. Resistor 210 is set to discharge capacitor 208 after 23 seconds if mode switch 120 is open. This is the beep-on mode. Thus for this mode FET 204 conducts after 23 seconds. When switch 120 is closed, a resistor 212 is also paralleled across capacitor 208 thereby increasing the discharge rate to approximately 3 seconds allowing FET 204 to conduct again after 3 seconds. This is the beep-off mode. Each time FET 204 conducts a momentary pulse, closure of relay 152 occurs since one side of the coil 148 of relay 152 always has a negative potential applied thereto, via lead 157, and a positive potential is applied to the other side, via lead 117, through contacts 9 and 10 of relay 206. Resistor 213 and capacitor 214 cause a single pulse closure of relay 152, and a resistor 216 discharges the capacitor 214 through contacts 8 and 9 of relay 152 so that capacitor 214 will cycle again on the next sequence. Therefore it is possible to pulse relay 152 at a 23 second rate in the beep-on mode and at a 3 second rate in the beep-off mode.

When relay 152 is pulsed closed, the opening of its contacts 8 and 9 momentarily removes the positive voltage on the gate of field-effect transistor 153 and thus cuts off the 3 millimeter holding current to the coupler unit control relay 50, causing it to open and to remain open until the next closure of contacts 9 and 10 of relay 217. This allows the first audio alert signal to be produced and applied on the telephone lines 15 seconds after the closure of relay 217, but then 23 seconds after the closure of relay 217 the pulsed operation of relay 152 causes the control relay 50 to open, inhibiting the subsequent alert signals 8 seconds after the first tone and 7 seconds before the telephone coupler unit would normally generate the next audio alert signal. If switch 120 were in the beep-off mode the control relay 50 would open in 3 seconds and never remain closed for the 15 second interval required to produce even the first audio alert signal.

When relay 152 is pulsed closed a negative voltage from terminal 160 of power supply 158 via lead 157 is applied through lead 165 to one side of the coil 113 of relay 154 through contacts 9 and 10 of relay 152. This keeps relay 154 closed preventing a break in the elapsed time measurement associated with the switch timing capacitor 170, even though the voltage from terminal 2 of plug 14P to the gate of FET 153 is removed thereby opening the circuit in series with contacts 2 and 7 of the plug 14P through contacts 8 and 9 of relay 152.

To summarize, the operation of the embodiment of the call timer device shown in FIGS. *6a* and *6b*, relay 154 is closed when the telephone hand-set 138 is removed and starts the timer circuit associated with switch timing capacitor 170. The discharged time constant of this timer circuit is initially controlled by the setting of First Alert time switch 116 and, after the preselected first alert time period, relay 217 momentarily closes causing control relay 50 (FIG. 5) to close and enable the telephone coupler unit 12 so as to apply a first audio alert signal to the local telephone lines via leads 20 and 22, 15 seconds after the closure. The closure of control relay 50 also applies a low level short duration "click" to the lines which click is just barely discernable and occurs 15 seconds prior to each alert and pre-alert time regardless of the setting of beep mode switch 120. The circuitry associated with FET 204 disenables the audio alert signal circuit of the telephone coupler unit 12 prior to the time a second alert signal (15 seconds after the first alert signal) would normally be applied by this unit.

The time duration before the unit 12 is again enabled is determined by the setting of Repeat Alert time switch 118. The control of the timer circuit associated with switch timing capacitor 170 is switched to switch 118 upon the closure of relay 219, which relay is "locked" closed during the remainder of the particular telephone call. The repeat audio alert signals will continue to be applied at the preselected interval set in switch 118 until the call is terminated whereupon relay 154 is de-energized and the call timer device is reinitialized so as to be ready to automatically repeat the above described operation to supervise the next call placed through the circuit 122 (FIG. 1) of switchboard 124.

As discussed above, in the beep-off mode the circuit associated with FET 204 has a 3 second repetition period and hence the required 15 second response period of the telephone coupler unit 12 is never allowed to occur so no audio alert signals are applied to the lines.

It has been determined that for maximum effectiveness the first audio alert signal should be set for the average time of the telephone calls for the particular organizations. Furthermore, the repeat audio alert signals should be set to recur at intervals corresponding to the average time of the overtime portion of the telephone calls. These average time periods are initially established by data recording equipment 220 shown in FIG. 7, which equipment when added to the embodiment of the circuitry shown in FIGS. *6a* and *6b* results in the configuration of apparatus enclosed within the housing shown in FIG. 3.

The data recording equipment 220 of FIG. 7 which is connected to the timer device of FIG. 6 will next be described. Primary power is applied to unit 220 by means of a plug 222, and a fuse 224 provides overload protection. A neon light 226 indicates when primary power is applied. A plug receptacle 228 is provided to accommodate plug 40 (FIG. 5) of coupler unit 12.

Two sets of data readout devices are provided by equipment 220. The first set of readout devices include total time meter 240 and call counter 242 which respectively display the total time of the telephone calls and the total number of telephone calls during a given period. This is mechanized by the circuit associated with FET 230 and relay 232. A 30 second delay is imposed by the circuit of FET 230 to allow for dialing and answering of the telephone so that the recorded time more closely follows the time on which telephone charges are based. FET 230 is normally nonconductive because of the negative charge applied via lead 235 on its input capacitor 238 from normally closed contacts 5 and 6 of relay 154. When relay 154 is energized as a result of the lifting of the telephone hand-set 138, the contacts 5 and 6 of relay 154 open and the negative source on the lead 235 is cut off from capacitor 238. Hence 30 seconds later capacitor 238 discharges causing FET 230 to conduct and thereby closes relay 232 which in turn starts the total meter 240 by closure of contacts 6 and 7 which closes a circuit across supply plug 222. Contacts 9 and 10 of relay 232 provide a negative return for call counter 242 to power supply 158. The series network of capacitor 244 and parallel resistor 246 provides a current impulse to the call counter 242 only once each time relay 232 closes. Once capacitor 244 is charged, the current through resistor 246 is sufficiently low to release the call counter 242 from a locked position so that it registers the count.

The other set of data gathering readout devices, alert call counter 250 and alert time meter 248, respectively, display the number of telephone calls which extend into the alert period and the total time of the telephone calls after the first audio alert signal. These functions are mechanized by a relay 252 which is energized at the time of the first audio alert signal by the connecting of lead 253 through closed contacts 6 and 7 of relay 219 and closed contacts 6 and 7 of relay 154 to the negative terminal of voltage supply 158. Contacts 6 and 7 of the relay 252 close a circuit across supply plug 222 to operate the alert time meter 248 and contacts 9 and 10 actuate the alert call counter 250. Lamp 256 provides a visual indication that the time duration of the telephone call is being recorded, and lamp 259 that the time duration after the first audio alert signal is being recorded. Switch 260 connected across leads 189 and 227 provides a remote mechanization of made switch 120 at the panel of the data recording equipment 220.

Figure 7:
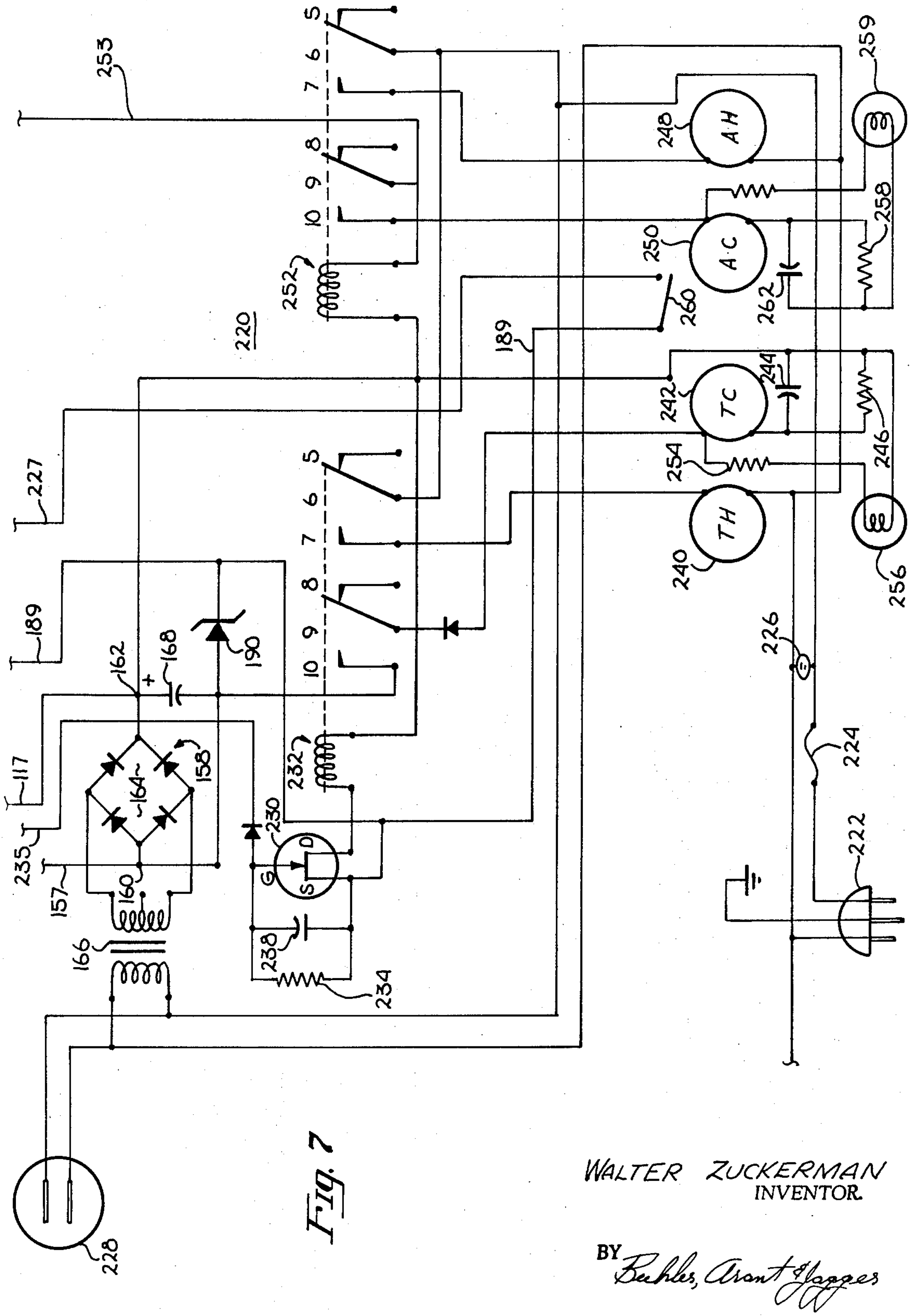
FIG. 7 is a schematic and block diagram of the data recording apparatus incorporated into the embodiment of the telephone call timer device depicted in FIG. 3.

In the embodiment of FIGS. 6*a*, 6*b* and 7, the below listed parameter values have proven to be satisfactory. However, it is understood that these values are included merely to provide the most complete disclosure possible, and they should not be interpreted as limiting the scope of the invention. It is understood that a great many combination of operative parameter values may be readily derived by those skilled in the art.

| Numerical Designation | Nomenclature | VALUE |
|---|---|---|
| 214 | Capacitor | 5.6 Microfarads |
| 208 | Capacitor | 68 Microfarads |
| 156 | Capacitor | 22 Microfarads |
| 168 | Capacitor | 50 Microfarads |
| 170 | Capacitor | 180 Microfarads |
| 191 | Capacitor | 1 Microfarads |
| 221 | Capacitor | 47 Microfarads |
| 244 | Capacitor | 50 Microfarads |
| 252 | Capacitor | 50 Microfarads |
| 238 | Capacitor | 68 Microfarads |
| 213 | Resistor | 68.2K Ohms |
| 216 | Resistor | 11 Ohms |
| 210 | Resistor | Selected at test |
| 212 | Resistor | 24.9 K Ohms |
| 192 | Resistor | 40.2 K Ohms |
| 193 | Resistor | 80.6 K Ohms |
| 194 | Resistor | 162 K Ohms |
| 195 | Resistor | 237 K Ohms |
| 179 | Resistor | 261 K Ohms |
| 178 | Resistor | 221 K Ohms |
| 177 | Resistor | 200 K Ohms |
| 176 | Resistor | 178 K Ohms |
| 175 | Resistor | 162 K Ohms |
| 174 | Resistor | 140 K Ohms |
| 180 | Resistor | 301 K Ohms |
| 181 | Resistor | 374 K Ohms |
| 182 | Resistor | 453 K Ohms |
| 183 | Resistor | 536 K Ohms |
| 184 | Resistor | 619 K Ohms |
| 202 | Resistor | 14.7 K Ohms |
| 171 | Resistor | 1300 Ohms |
| 169 | Resistor | 1400 Ohms |
| 201 | Resistor | Selected at test |
| 203 | Resistor | 619 Ohms |
| 185 | Resistor | 14.7 K Ohms |
| 111 | Resistor | 1 K Ohms |
| 115 | Resistor | 2 K Ohms |
| 203 | Resistor | 14.7 K Ohms |
| 187 | Resistor | 475 Ohms |
| 234 | Resistor | Selected at test |
| 110 | Resistor | 2 K Ohms |
| 246 | Resistor | 4420 Ohms |
| 258 | Resistor | 4420 Ohms |
| 254 | Resistor | 360 Ohms |
| 257 | Resistor | 360 Ohms |
| 173 | Zener Diode (22 volt) | IN4748 |
| 190 | Zener Diode (9.1 volt) | IN4739 |
| 204 | FET/N-Channel | 2N5163 |
| 172 | FET/N-Channel | 2N4302 |
| 188 | NPN Transistor | 2N721 |
| 199 | SCR | TSW60C |
| 230 | FET/N-Channel | 2N5163 |
| 153 | FET/N-Channel | 2N5163 |

In operation of the call timer device 10 the time period $T_1$, before the first audio alert signal is applied on the local telephone lines after the associated telephone is placed in use, is determined by the setting of First Alert time switch 116. The time period $T_1$ includes a 15 second delay period between the closing of relay 50 (FIG. 5) and the first audio alert signal. The relay 217 and control relay 50 close after a period $T_2$ ($T_2$ is equal to $T_1$ minus 15 seconds) from the time the telephone is placed into operation.

The time period $T_1$, set in the First Alert time switch 116 is selected to correspond to the expected length of an average business call for a particular organization. In the illustrated embodiment the below listed time values are selectable by switching in the corresponding resistors connected to the First Alert time by way of example, and are not limiting. Any time delay values may readily be designed into the device.

TIME SWITCH 116

| Resistor Reference Designation | Resistor Value (in 1,000 of Ohms) | Time Period T (Minute:Seconds) |
|---|---|---|
| 174 | 140 | 2:00 |
| 175 | 162 | 2:15 |
| 176 | 178 | 2:30 |
| 177 | 200 | 2:45 |
| 178 | 221 | 3:00 |
| 179 | 261 | 3:30 |
| 180 | 301 | 4:00 |
| 181 | 374 | 5:00 |
| 182 | 453 | 6:00 |
| 183 | 536 | 7:00 |
| 184 | 619 | 8:00 |

The time period prior to the application of the first repeat audio alert signal, after the first audio alert signal, as well as the time period between subsequent repeat audio alert signals, is determined by the setting of Repeat Alert time switch 118. Similarly to time switch 116, this switch may be set to correspond to a number of different time intervals. In the illustrated embodiment the below listed time values are selectable by switching in the corresponding resistors connected to time switch 118. It is understood these values are given merely by way of example, and are not limiting.

TIME SWITCH 118

| Resistor Reference Designation | Resistor Value (in 1,000 of Ohms) | Time Period (Minutes:Seconds) |
|---|---|---|
| 192 | 40.2 | :30 |
| 193 | 80.6 | 1:00 |
| 194 | 162.0 | 2:00 |
| 195 | 237.0 | 3:00 |

Figure 3:
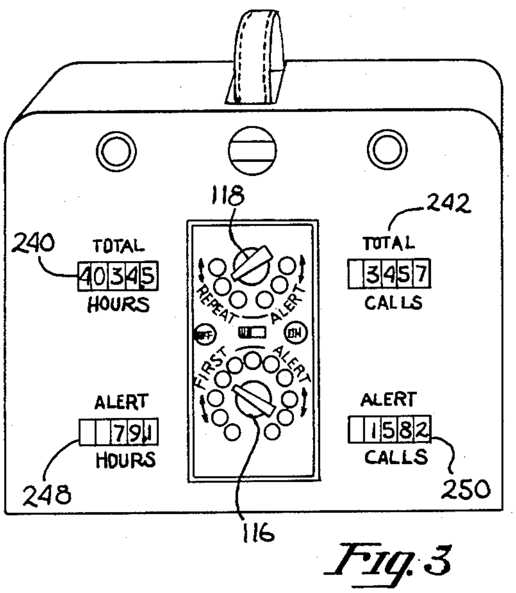
FIG. 3 is a perspective view of a housing enclosing an embodiment of a telephone call timer device that includes the data readout equipment shown in FIG. 7 for monitoring usage history of the telephone lines associated with the timer device.

As previously mentioned, the embodiment of the call timer system in FIG. 3 includes the data monitoring equipment 220 shown in FIG. 7 which equipment is used for data acquisition. Initially the call timer device 10 has its mode switch 120 set to the Beep-off position to determine the normal telephone habits of a company, say, for long distance calls. This study should be considered preferably without the knowledge of the using personnel, so that a more realistic reference base estimate of average call duration may be established. As previously described, the data monitoring equipment 220 includes two sets of data readout. The first set of data readout includes the toll time meter 240 and the call counter 242. The second set of data readout includes the alert timer meter 248. and the alert call counter 250. As described in connection with FIG. 7 there is an automatic delay time of 30 seconds built into the data monitoring equipment 220 to allow for dialing of the number after the hand-set is lifted from the telephone, after which the total time meter 240 will log the amount of time consumed and the call counter 242 will indicate the number of calls which have been placed. When a call has reached the preselected time set in the First Alert time switch 116, the second set of data readout will be activated resulting in the alert time meter 248 logging the duration of the overtime portion of the call and the alert call counter 250 registering the call as an additional count therein.

An ideal initial setting for the First Alert time switch 116 would be the average length of all long distance calls over a fixed period, such as a day, a week or a month. The average length is established by dividing the total time of the long distance calls as indicated by toll time meter 240 by the total number of calls indicated by the call counter 242. A national average of long distance calls has been established as 7 minutes (FIG. 4), but the time may be more or less for a particular business organization study. Then by setting the switch 116 of call timer device 10, to impress a first alert for this time, say 7 minutes, the average length of the overtime portion of the long distance calls is established by dividing the total alert time of the long distance call as indicated by alert time meter 248 by the total number of the calls that extend into the overtime period as indicated by alert call counter 250. A typical, average length of overtime might be 3 minutes.

Having acquired the data which determines the normal telephone habits of a business organization, by means of a bulletin, employees of the organization would be advised of the timing system and the significance of the alert tones that will be heard on the local telephones when the system is in operation. The bulletin should be worded to the effect that every effort should be made to conclude the call if possible as soon as the alert is heard.

The timing device 10 is now placed in operation with the First Alert time switch 116 and the Repeat Alert time switch 118 set to the average talk time. For example, assuming the data estimate of average length of long distance calls is 7 minutes, the First Alert time switch 116 is set at 7 minutes; and assuming the estimate of average length of the calls that extend past 7 minutes is 3 minutes, the Repeat Alert timer switch 118 is set for 3 minutes. In addition the mode switch 120 is now placed in the beep-on position.

With the controls on the timer device 10 having been set as above described, whenever the telephone handset 126 is lifted from the cradle, the call timer device 10 is automatically initiated and after 6 minutes and 45 seconds have passed the user of the local telephone will receive a prealert click (caused by control relay 50 closing) followed in 15 seconds by the first audio alert tone. There will then be 3 minutes of talk time before the next audio alert tone is impressed on the lines. Of course, if the call is completed prior to the 3 minutes the next alert will not be heard and the sequencing of the call duration timer 10 will automatically start over again when the next call is initiated by the lifting of the hand set of the telephone.

Figure 4:
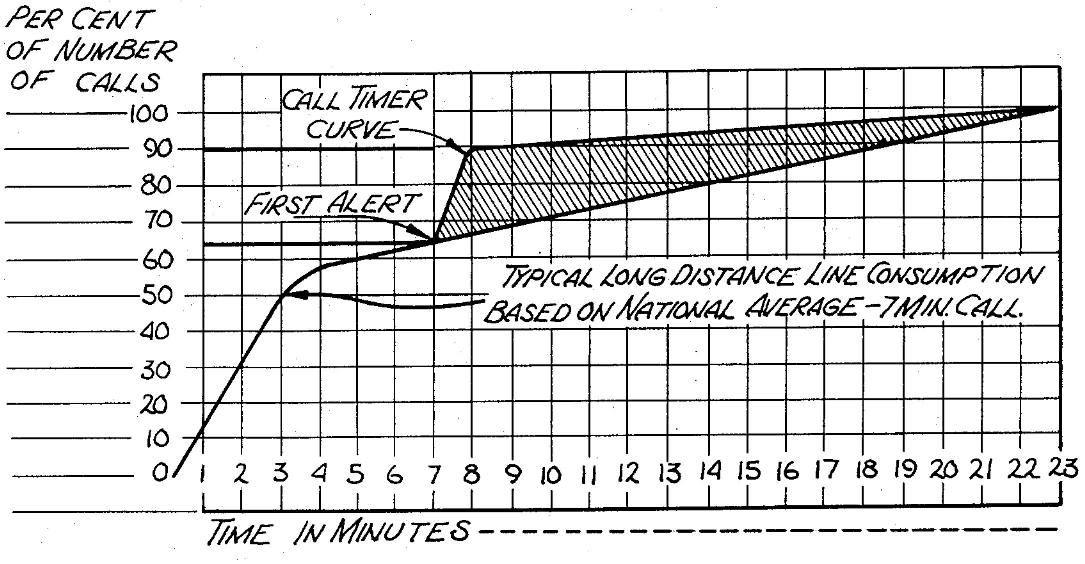
FIG. 4 is a graph showing the effect the call timer device of the present invention can have on reducing the time duration of telephone calls supervised thereby.

As shown by the graph in FIG. 4, after a given period of time, as a result of the call timer device 10 being operated with the associated local telephone, the alert time meter and alert call counter in equipment 220 should show a large decrease of overtime calls. In a newly installed system the per call average time may be reduced as much as 2 minutes. Thus, as indicated in FIG. 4, whereas without the call timer device, 65 percent of the number of long distance telephone calls would include calls lasting 7 minutes and 90 percent of the number of these calls would include calls lasting as long as 19 minutes, with the call timer device 10 installed as many as 90 percent of the number of long distance telephone calls would be terminated within 8 minutes, i.e., within a minute after the first alert signal is heard. At this point, if desired, the position of the first alert time switch 116 and/or the repeat alert time switch 118 may be set to their next lower time setting to further hasten the user to conclude the calls.

It is noted that the call timer device 10 may be connected to the telephone coupler unit 12, which provides for connecting the central office to a switchboard 124, whereby any number of telephone extensions, capable of being connected to the switchboard will be monitored by the call timer device. In particular, the operator could place all long distance calls through lines associated with call timer device 10. This procedure usually produces maximum savings by reducing overtime charges on long distance calls.

Thus there has been described a system for automatically supervising the usage of telephone lines. The practical value of the system is enhanced by its versatility which makes it adaptable to the needs of almost any organization regardless of whether its telephone usage is large or small. In accordance with the invention any desired level of supervision may be selected and means are included for acquiring data from which the optimum level of supervision may be ascertained. Alerting of the local caller as to the duration of the call is accomplished without causing any concern to the other party and without degrading the overall quality of the communications.

It should be noted that while the invention has herein been shown and described in what is conceived to be its most practical and preferred embodiment, it is realized that departure may be made therefrom within the scope of the invention which is not limited to the details disclosed herein, but is to be afforded the full scope of the claims so as to embrace any and all equivalent devices.

Having described the invention what is claimed as new in support of Letters Patent is:

1. A system for supervising the usage of a telephone line by alerting the user of a local telephone making a call on said telephone line that said call has exceeded a preselected period of time, said system comprising:
   a telephone coupler unit associated with the local telephone line, said telephone coupler unit including
   a voltage source,
   a pair of output terminals,
   a first relay having a coil, said first relay coil being connected in series with said voltage source and said pair of output terminals when said telephone line is in use,
   audio alert signal generating means, and
   signal transmission control means,
   said first relay when actuated providing for controlling the coupling of said audio signal transmission control means and said audio alert signal generating means to said telephone line;
   sensing means connected to said pair of output terminals,
   said sensing means including a second relay having a coil connected in a circuit with said first relay coil when said telephone is in use, the current in said circuit being operable to actuate said second relay but not said first relay,
   said first relay capable of being actuated when said pair of output terminals are momentarily shorted and continuing to be actuated thereafter by the current in said circuit;
   timing means initiated to operate when said second relay is actuated to provide a first timing signal output when said telephone line has been in continuous use for a first preselected time period; and
   actuating means operable in response to the first timing signal output of said timing means for momentarily short circuiting said pair of output terminals to actuate said first relay and thereby control said audio alert signal generating means to apply a first audio alert signal on said telephone line and control said signal transmission control means to prevent said audio alert signal from being transmitted through the telephone line leading away from the local telephone, while permitting said audio alert signal to be transmitted through the telephone line leading to the local telephone.

2. The invention in accordance with claim 1, wherein said timing means includes a timing capacitor and a plurality of different size resistors, means for charging said capacitor prior to the actuation of said second relay, means to start discharging said capacitor through a selected one of said resistors after the actuation of said second relay, and solid state circuit means for sensing when said capacitor is discharged to provide a timing signal to render said actuating means operable.

3. The invention in accordance with claim 1, wherein said system further comprises disabling means for momentarily interrupting the current to the coil of said first relay after said first audio alert signal is applied on said telephone line, thereby preventing additional audio alert signals from being applied to said telephone lines until another timing signal is applied to said actuating means.

4. The invention in accordance with claim 1 wherein said timing means provides recurring timing signals at second preselected time intervals following said first audio alert signal, and wherein said actuating means further responds to said recurring timing signals for controlling said telephone coupler unit to apply recurring audio alert signals to said telephone line at said second preselected time intervals throughout the remainder of the call, and disabling means for momentarily interrupting the current to the coil of said first relay after each audio alert signal is applied to said telephone line, thereby preventing additional audio alert signals from being applied until after the next timing signal is applied to said actuating means.

5. A telephone system located at the site of a subscriber's telephone for monitoring the usage of a telephone line by said subscriber's telephone, said system comprising:
   a telephone coupler unit including
   an audio signal generator, and
   a band elimination filter,
   said telephone coupler unit being adapted to be placed in a standby condition when the receiver of said subscriber's telephone is lifted off its cradle to place a call on the telephone line; and
   a call duration timer including
   a sensing circuit connected to said telephone coupler unit and providing an output at the instant said telephone coupler unit is placed in a standby condition,
   a timing means including a controller therefor, said timing means initiated into operation by said sensing circuit output to provide a timing signal when said telephone receiver has been off its cradle for an initial time period preselected by said controller, and
   an actuation circuit effective in response to said timing signal to actuate said telephone coupler unit to connect said band elimination filter to said telephone line and to simultaneously apply an audio signal from said audio signal generator to said telephone line between said band elimination filter and said subscriber's telephone,
   whereby said band elimination filter is effective to restrict the audio signal on said telephone line so that it is only heard on the subscriber's telephone.

6. A telephone system located at the site of a local telephone for alerting the user of the local telephone that the usage of a telephone line by the local telephone has exceeded a preselected time period, said system comprising:
   a telephone coupler unit associated with the local telephone, said telephone coupler unit including audio alert signal generating means and capable of being controlled to apply audio alert signals to said telephone line, and said telephone coupler unit including signal transmission control means and capable of being controlled to connect said signal transmission control means to said telephone line, said telephone coupler unit adapted to be placed in a standby condition when the receiver of the local telephone is lifted off of its cradle, sensing means electrically connected to said telephone coupler unit and providing an output at the instant said telephone line is placed in use by lifting the receiver of the local telephone off its cradle, timing means coupled to be initiated into operation by the output of said sensing means and providing a first timing signal when said telephone line has been in continuous use for said preselected time period, and providing recurring timing signals at preselected timing intervals thereafter, and actuating means effective in response to said first and recurring timing signals for controlling said telephone coupler unit to connect said signal transmission control means to said telephone line and to cause said telephone coupler unit to apply a first audio alert signal and thereafter recurring audio alert signals from said audio alert signal generating means to said telephone line between said signal transmission control means and said local telephone, whereby said signal transmission control means is effective to restrict the audio alert signals applied on the telephone line so that they are only heard on the local telephone.

7. A telephone system located at the site of a subscriber for alerting the user of the local telephone at the site of the subscriber that the usage of a telephone line by the local telephone has exceeded a predetermined time period, said system comprising:

a telephone coupler unit including an audio signal generator, and a band elimination filter, said telephone coupler unit being adapted to be placed in a standby condition when the receiver of the local telephone is lifted off its cradle to place a call on the telephone line, and a call duration timer including a sensing circuit connected to said telephone coupler unit and providing an output when the receiver of said local telephone has been lifted off its cradle, a timing circuit comprising a first plurality of timing elements and a second plurality of timing elements, a first timing switch settable to render operable a selected timing element of said first plurality of timing elements, a second timing switch settable to render operable a selected timing element of said second plurality of timing elements, said timing circuit having the selected timing element of said first plurality of timing elements initiated into operation by the output of said sensing circuit and having the selected timing element of said second plurality of timing elements initiated into cyclical operation at the end of the period defined by the selected timing element of said first plurality of timing elements, said timing circuit providing a first output timing signal when the usage of the telephone line by the lifting of the local telephone receiver off its cradle continues for the period defined by the selected timing element of said first plurality of timing elements and providing a recurring output timing signal at the end of each of the recurring timing intervals defined by the selected timing element of said second plurality of timing elements, and an actuation circuit for actuating said telephone coupler unit to connect said band elimination filter to said telephone line and to apply an audio alert signal from said audio signal generator to said telephone line between said band elimination filter and said local telephone in response to said first output timing signal and each of the following recurring output timing signals, whereby said band elimination filter is effective to restrict the audio alert signals applied on said telephone line so that they are only heard on the local telephone.

8. A telephone installation located at the site of a subscriber for monitoring the usage of a telephone line by said subscriber's telephone instrument, said installation comprising:

a telephone line for coupling the subscriber's telephone instrument to a central office, a telephone coupler unit associated with said subscriber's telephone instrument and said telephone line, said telephone coupler unit including audio signal generating means, relay means for controlling the impressing of an audio signal generated by said audio signal generating means on the telephone line, and filter means arranged to be connected to said telephone line by said relay means to pass an audio signal impressed on the telephone line to the subscriber's telephone instrument and block said audio signal from passing to the central office, a call duration timer device including a sensing circuit electrically connected to said telephone coupler unit for sensing and providing an output at the instant the receiver of the subscriber's telephone instrument is lifted off its cradle, circuit means including timing circuit means initiated into operation by said sensing circuit output and providing timing signals for actuating said relay means, said timing circuit means having a first manually settable time switch for selecting an initial time period when a first timing signal is provided by said timing circuit means for actuating said relay means and having a second manually settable time switch for selecting the time interval at which recurring timing signals are thereafter provided by said timing circuit means for actuating said relay means, and said relay means when actuated providing for controlling the connecting of said filter means to said telephone line and the impressing of an audio signal generated by said audio signal generating means on said telephone line between said filter means and said subscriber's telephone instrument.

* * * * *